Feb. 27, 1934.  B. O'HARA ET AL  1,949,322
SWITCH
Filed July 25, 1932  2 Sheets-Sheet 2
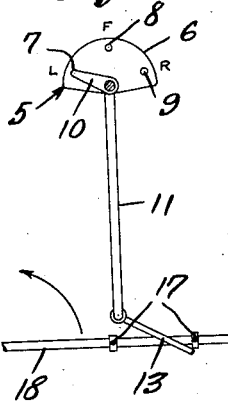
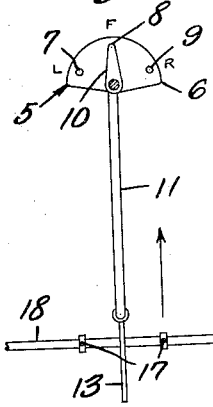
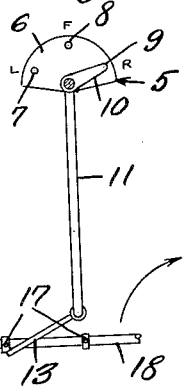
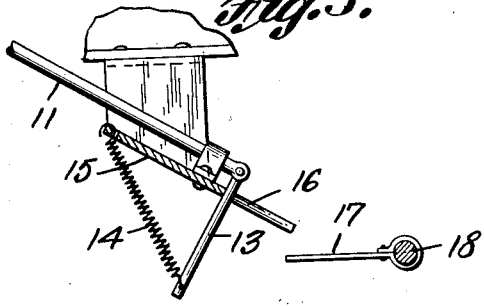
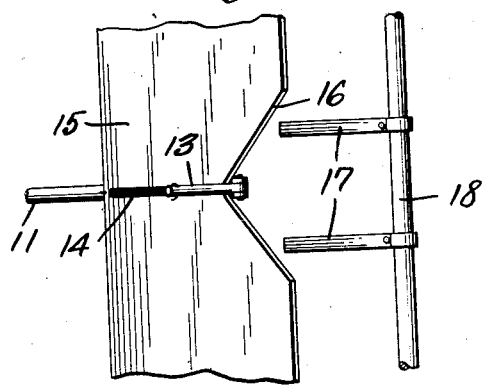
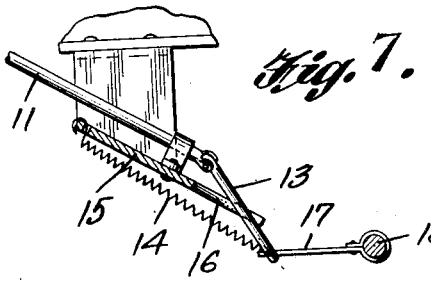
Bernard O'Hara,
Walter Herring,
INVENTORS
BY Victor J. Evans & Co.
ATTORNEY
WITNESS:

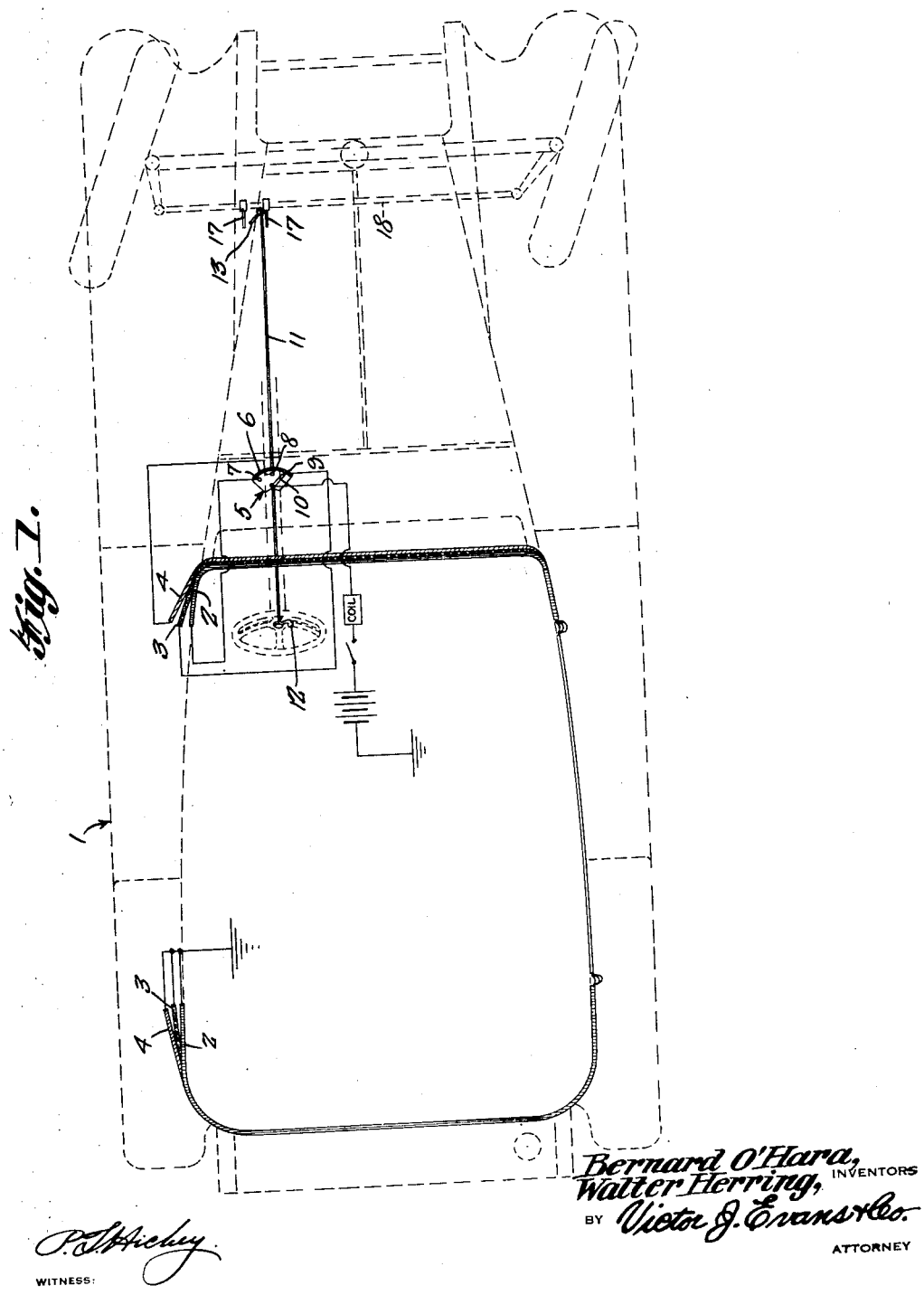

Patented Feb. 27, 1934

1,949,322

UNITED STATES PATENT OFFICE 1,949,322

SWITCH

Bernard O'Hara and Walter Herring, Oklahoma City, Okla.

Application July 25, 1932. Serial No. 624,590

1 Claim. (Cl. 200—59)

This invention relates to switches for operating electrical direction signals for motor vehicles and has for the primary object, the provision of a device of the above stated character, whereby any one of several electrical circuits may be opened and closed to operate the signals for indicating the course to be taken by a vehicle, either a turn to the right or left or to proceed straight ahead.

A further object of this invention is the provision of a switch, whereby a straight course may be indicated until actuated manually for giving a signal of a turn in either direction which automatically renders the straight course signal inoperative until after completion of the turn in either direction whence the straight course signal is automatically restored to operation.

With these and other objects in view, this invention consists in certain novel features of construction, combination and arrangement of parts to be hereinafter more fully described and claimed.

For a complete understanding of our invention, reference is to be had to the following description and accompanying drawings, in which Figure 1 is a diagrammatical plan view showing a motor vehicle with signals applied thereto and constructed in accordance with our invention.

Figure 2 is a diagrammatical view showing a switch controlling the signals and positioned to complete a circuit to certain of said signals for indicating a left hand turn.

Figure 3 is a similar view showing the switch positioned to complete a circuit to the straight course signal.

Figure 4 is a similar view showing the switch positioned to complete the circuit to the signals for indicating a right hand turn.

Figure 5 is a fragmentary sectional view showing an automatic control for the switch for restoring the latter to a position as that shown in Figure 3 to complete the circuit of the straight course signal.

Figure 6 is a fragmentary bottom plan view illustrating the same.

Figure 7 is a fragmentary sectional view showing the control occupying the position after the manual actuation of the switch to be returned to its initial position automatically after the completion of a turn of the vehicle in either direction.

Figure 8 is a fragmentary sectional view showing the switch.

Referring in detail to the drawings, the numeral 1 indicates a conventional type of motor vehicle having secured to the front and rear thereof electric signals 2, 3 and 4. The signals 2, 3 and 4 are of different colors to denote right and left hand turns and a straight course and are preferably arranged on the body of the vehicle adjacent the roof thereof with the signals extending entirely across the front and rear of the body and onto the sides thereof so that the signals may be readily noticeable either from the front, rear or sides of the respective vehicle. The signals 2, 3 and 4 are electrically illuminated and placed in an electric circuit as shown in Figure 1 controlled by a switch 5. The switch 5 consists of a contact plate 6 having contacts 7, 8 and 9. The contacts are electrically connected to their respective signals and are engaged by a switch arm 10 electrically connected to the electric source of the circuit as shown in Figure 1. The switch arm 11 is movable from one contact to the other and carried by an operating rod 11 suitably mounted on the vehicle adjacent the steering post thereof and equipped at its upper end with an operating lever 12 arranged adjacent the steering wheel so that the driver may conveniently move the switch 10 into engagement with the contacts 7 or 9. The normal position of the switch arm is in engagement with the contact 8 so as to complete the circuit to the signals 4 for the purpose of indicating a straight course.

An arm 13 is pivoted to the lower end of the operating rod 11 and is normally maintained at right angles thereto as shown in Figure 7 by a coiled spring 14. The spring 14 is attached to a track 15 secured to the frame of the vehicle adjacent the front wheels and is provided with cam faces 16. The cam faces diverge from each other as shown in Figure 8 with the arm 13 positioned therebetween and out of the path of spaced projections 17 carried by the connecting bar 18 located between the front wheels of the motor vehicle and forming a part of a conventional steering mechanism.

The operator of the motor vehicle when contemplating a turn to the left moves the lever 12 in the proper direction to bring the switch arm 10 in engagement with the contact 7 interrupting the circuit to the signals 4 and completing the circuit to the signals 2 whereby pedestrians and traffic in the vicinity of the respective vehicle will be informed of the turn to the left. The movement of the lever 12 by the operator imparts a corresponding movement to the operating rod 11 moving the arm 13 into a position as shown in Figure 9, within the path of movement of the projections 17 by riding against one of the cam faces 16 and as the steering mechanism is turned to straighten the front wheels of the vehicle, one of the projections 17 engages the arm 13 imparting a reverse movement to the operating rod 11 restoring the switch arm 10 in engagement with the contact 8 thereby breaking the circuit to the signals 2 and completing the circuits to the signals 4 indicating that the respective automobile is to proceed in a straight course. To indicate a right hand turn the movement of the lever 12 is in a reverse direction engaging the switch arm 10 with the contact 9 simultaneously interrupting the circuit to signals 4 and completing the circuit to the signals 3 to indicate a right hand turn. The movement of the lever 12 in the last named direction positions the arm 13 in engagement with the other cam 16 and within the path of movement of the extensions 17 so that when the steering mechanism of the vehicle is operated to restore the front wheels in a straight position, the operating rod 11 is reversely moved to again engage the switch arm and the contact 8 interrupting the circuit to the signals 3 and restoring the circuit to the signals 4.

A suitable switch may be placed in the electric circuit as shown in Figure 1 for the purpose of rendering the device inoperative when the automobile is parked or in non-use.

While we have shown and described the preferred embodiment of our invention, it will be understood that minor changes in construction, combination and arrangement of parts may be made without departing from the spirit and scope of our invention, as claimed.

Having thus described our invention, what we claim is:

A direction signal comprising a hand operated rotatable switch to make and break circuits to signals, a pivoted arm carried by the switch and movable therewith, a fixed track having a V-shaped notch to receive therein the arm and the walls of said notch providing diverging cam faces to act on said arm and cause pivotal movement thereof during the movements of the switch, a contractile spring between the track and the arm, and spaced extensions on a steering mechanism to move said arm to its normal position after being positioned in the path of said extensions by the cam faces.

BERNARD O'HARA.
WALTER HERRING.